United States Patent
Gyulai

(10) Patent No.: US 12,531,307 B2
(45) Date of Patent: Jan. 20, 2026

(54) BATTERY ARRANGEMENT AND METHOD FOR DISCHARGING A GAS FROM A BATTERY CELL

(71) Applicant: AUDI AG, Ingolstadt (DE)

(72) Inventor: Tamas Gyulai, Pfaffenhofen an der Ilm (DE)

(73) Assignee: AUDI AG, Ingolstadt (DE)

( * ) Notice: Subject to any disclaimer, the term of this patent is extended or adjusted under 35 U.S.C. 154(b) by 542 days.

(21) Appl. No.: 18/075,764

(22) Filed: Dec. 6, 2022

(65) Prior Publication Data
US 2023/0187771 A1    Jun. 15, 2023

(30) Foreign Application Priority Data

Dec. 9, 2021    (DE) .......................... 102021132479.3

(51) Int. Cl.
*H01M 50/342*    (2021.01)
*H01M 10/613*    (2014.01)
(Continued)

(52) U.S. Cl.
CPC ..... *H01M 50/3425* (2021.01); *H01M 10/613* (2015.04); *H01M 10/625* (2015.04); *H01M 10/6554* (2015.04); *H01M 10/6556* (2015.04); *H01M 50/209* (2021.01); *B60R 16/03* (2013.01); *H01M 2200/20* (2013.01); *H01M 2220/20* (2013.01)

(58) Field of Classification Search
None
See application file for complete search history.

(56) References Cited

U.S. PATENT DOCUMENTS

2010/0273034 A1* 10/2010 Hermann ................ B60L 50/64
                                                          429/62
2012/0196163 A1*  8/2012 Shimizu .............. H01M 50/367
                                                          429/57
(Continued)

FOREIGN PATENT DOCUMENTS

DE    102009046385 A1    5/2011
DE    102013216071 A1    2/2015
(Continued)

OTHER PUBLICATIONS

German Office Action issued on Sep. 7, 2022, in corresponding Application No. 102021132479.3, 14 pages.

*Primary Examiner* — Ula C Ruddock
*Assistant Examiner* — Maria F Orozco
(74) *Attorney, Agent, or Firm* — Maier & Maier, PLLC

(57) ABSTRACT

A battery arrangement having a cooling wall arrangement, which includes a cooling wall, and having a battery unit, arranged above the cooling wall arrangement in relation to a first direction, which includes a battery cell which has a first side having a releasable degassing opening facing toward the cooling wall. The battery arrangement has a degassing channel in which gas escaping from the degassing opening. The degassing channel is arranged below the releasable degassing opening and above the cooling wall with respect to the first direction and is designed in such a way that in case of the gas escape of the gas from the degassing opening, a first part of the gas escaping from the degassing opening chronologically first is introducible into the degassing channel.

15 Claims, 2 Drawing Sheets

(51) Int. Cl.
*H01M 10/625* (2014.01)
*H01M 10/6554* (2014.01)
*H01M 10/6556* (2014.01)
*H01M 50/209* (2021.01)
*B60R 16/03* (2006.01)

(56) References Cited

U.S. PATENT DOCUMENTS

2013/0059175 A1* 3/2013 Engel ................ H01M 10/0413
 429/82
2023/0327284 A1* 10/2023 Godding ........... H01M 10/6554
 429/56

FOREIGN PATENT DOCUMENTS

| DE | 102017212223 A1 | 1/2019 | |
|----|-----------------|--------|--|
| DE | 102017219176 A1 * | 5/2019 | .......... H01M 50/209 |
| DE | 102019118905 A1 | 1/2021 | |
| DE | 102020125651 A1 * | 4/2022 | ........ H01M 10/6556 |

* cited by examiner

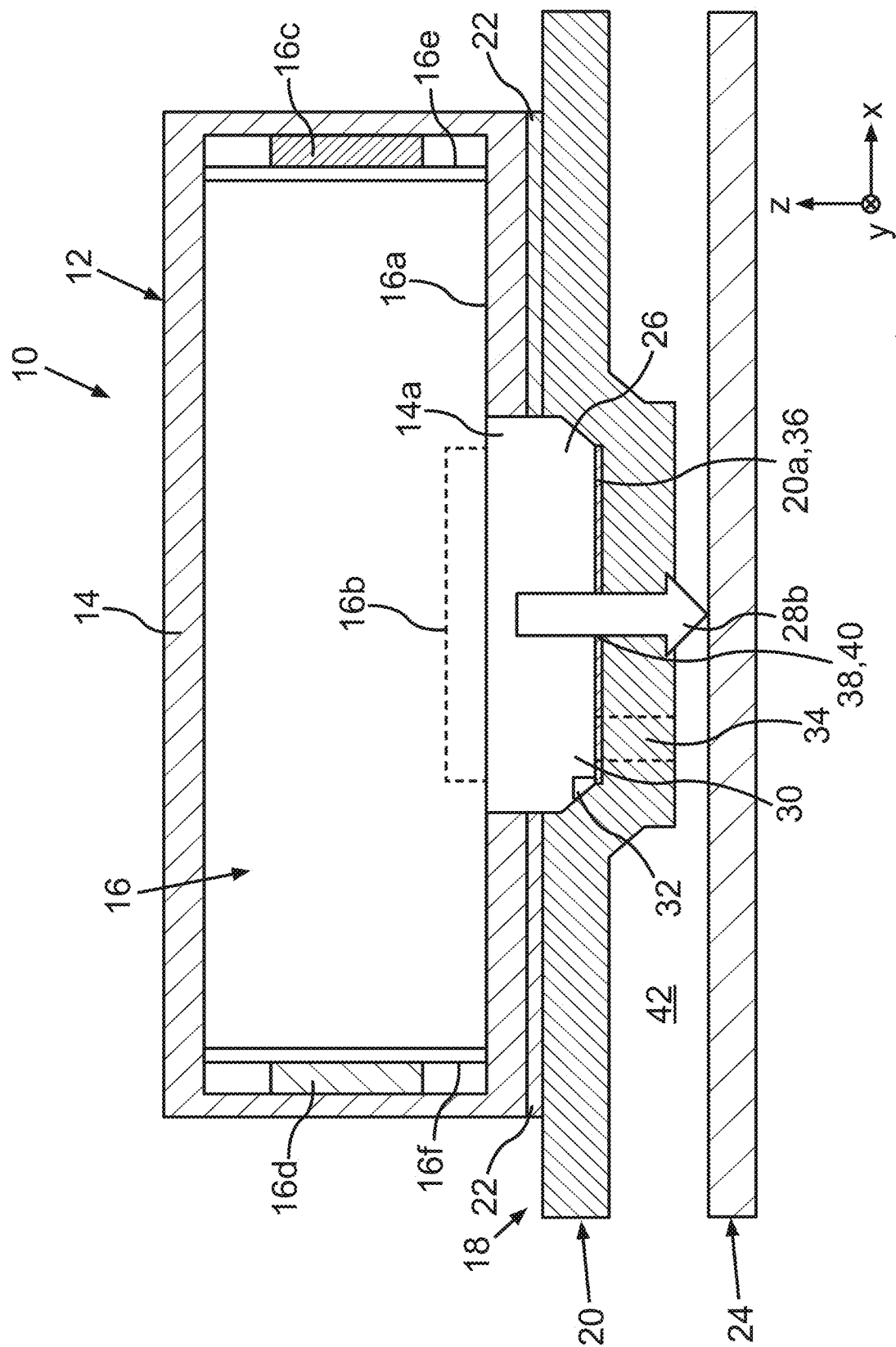

BATTERY ARRANGEMENT AND METHOD FOR DISCHARGING A GAS FROM A BATTERY CELL

FIELD

The invention relates to a battery arrangement for a motor vehicle, which has a cooling wall arrangement that comprises a cooling wall, and at least one battery unit that is arranged on the cooling wall arrangement and above the cooling wall arrangement with respect to a first direction and that comprises at least one battery cell. The at least one battery cell has a first side having a releasable degassing opening, which is releasable to discharge a gas from the at least one battery cell, wherein the battery arrangement has a degassing channel into which, in case of a gas escape of a gas from the degassing opening of the at least one battery cell, the escaping gas is at least partially introducible. The battery unit is arranged on the cooling wall arrangement in such a way that the first side of the at least one battery cell faces toward the cooling wall arrangement. Furthermore, the invention also relates to a method for discharging a gas escaping from a degassing opening of at least one battery cell of a battery arrangement.

BACKGROUND

In conventional batteries, in particular high-voltage batteries, for motor vehicles, in which common prismatic battery cells are used, the cell poles of which are arranged on an upper side of the cells, the degassing openings of such cells are typically also arranged on the upper side. Furthermore, a degassing channel is often provided, which is also arranged above the cells and into which the gas escaping from a degassing cell is introduced. In this case, such a degassing channel is often part of a cell module or battery module, which has multiple battery cells arranged in a module housing. However, it can also be provided as an additional separate component.

For example, DE 10 2013 216 071 A1 describes a galvanic system having multiple galvanic cells and a degassing device for discharging a fluid escaping from one or more of the galvanic cells. The degassing device has an inlet opening for each cell, with which a closure element is associated in each case, which prevents a fluid from flowing out of the degassing device via the inlet opening closed by the closure element. The respective inlet openings of the degassing device can be integrated with their associated closure elements in a module cover of a battery module. If a gas thus escapes from a cell and enters the degassing device through the inlet opening, this gas accordingly passes through the module cover.

Furthermore, battery cells are also known from the prior art which have a releasable cell degassing opening on a side which does not represent the side on which the cell terminals are arranged. In this case, the side of the battery cell on which the releasable cell degassing opening is then arranged can represent that side which faces toward a cooling device or cooling plate and in particular is arranged on such a cooling plate.

For example, DE 10 2017 212 223 A1 describes a battery having multiple energy storage cells, each of which has a housing opening which is closed by a bursting membrane, wherein a cooling plate having a passage, which aligns with the housing opening of the cells, is arranged between the cell housing of such a cell and a cell degassing space. In case of cell degassing, the gas escaping from the cell can be conducted through the cooling plate into the cell degassing space. At the same time, coolant can enter the cell housing from the cooling plate.

Furthermore, DE 10 2019 118 905 A1 describes a cooling system for an energy storage device, which has a cooling element which has a wall and a volume delimited by the wall and through which a coolant can flow, wherein a passage is introduced into the cooling element, which is at least partially separated from the volume by the wall, wherein an emergency opening device is associated with the passage, which opens when exposed to heat and/or pressure and thus creates a flow-conducting connection between the volume and the passage. In this case as well, the gas flowing out of a battery cell can be guided through the passage through the cooling element and discharged. In addition, coolant from the cooling element can again be fed to the relevant energy storage cell.

Furthermore, DE 10 2009 046 385 A1 describes a battery having a degassing system which has a base plate and at least one cell module which is arranged on the base plate and has at least one battery cell which has an underside having a degassing opening. At the location of the degassing opening, the base plate has at least one passage to a collection area, which can be delimited on the underside by a housing wall. The base plate can also be designed as a cooling plate, for example. The gas escaping from the battery cells is also guided here through a cooling plate into a collection area. In this case, the collection area can be partially integrated into the cooling plate as a depression on a side of the cooling plate opposite to the battery cells.

A cooling plate, for example a cooling base, often represents part of a battery housing at the same time, for example the base of a battery housing. Since the battery housing is supposed to protect the cells accommodated in it as well as possible against environmental influences, such as the penetration of moisture or dirt, the battery housing has to have a closed design. If the gas escaping from a battery cell is to be discharged through a cooling plate, an additional, protective housing wall has to be provided if this takes place through a permanent opening in the cooling plate, or the passage opening through the cooling plate has to be designed having a very complex closure, which, however, has to ensure reliable opening in case of degassing in order to prevent an uncontrolled explosion of the arrangement. Correspondingly, the discharge of the gases through a cooling device is very complex.

It would therefore be desirable to be able to provide a more efficient, simpler, and yet reliable gas discharge option. Another important aspect in connection with the thermal runaway of a battery cell is represented by the detection of such a thermal event, for example to be able to warn the driver of a vehicle as early and also reliably as possible and to avoid false warnings. In addition, it is also desirable to be able to detect gas escaping from a cell as simply and reliably as possible, and above all as early as possible.

SUMMARY

The object of the present invention is therefore to provide a battery arrangement and a method which enable gas escaping from a degassing opening of a cell that faces toward a cooling wall to be discharged as simply, efficiently, and safely as possible, and in particular enable such a gas escape to also be detected as reliably and early is possible.

A battery arrangement according to the invention for a motor vehicle has a cooling wall arrangement that comprises a cooling wall, and at least one battery unit that is arranged on the cooling wall arrangement and above the cooling wall arrangement with respect to a first direction and that comprises at least one battery cell. The at least one battery cell has a first side having a releasable degassing opening, which is releasable to discharge a gas from the at least one battery cell, wherein the battery arrangement has a degassing channel into which, in case of a gas escape of a gas from the degassing opening of the at least one battery cell, the escaping gas is at least partially introducible. Furthermore, the battery unit is arranged on the cooling wall arrangement in such a way that the first side of the at least one battery cell faces toward the cooling wall arrangement. The degassing channel is arranged below the releasable degassing opening and above the cooling wall with respect to the first direction and is designed in such a way that in case of the gas escape of the gas from the degassing opening, a first part of the gas escaping from the degassing opening chronologically first is introducible into the degassing channel.

The part of the gas that escapes chronologically first is therefore not conducted directly through the cooling wall to a side of the cooling wall opposite to the battery unit, but is at least initially introduced into a degassing channel which is arranged between the battery unit and the cooling wall, i.e., into a channel which is arranged on the same side of the cooling wall as the battery unit having the outgassing battery cell. The invention is based on several findings: On the one hand, the invention uses the knowledge that the typical gas escape behavior of battery cells may be divided into two escape phases, which differ significantly in terms of the type of gas escape. The chronologically first, very short phase relates above all to the first second of the gas escape, in particular to the first milliseconds of the gas escape. In this first phase of the gas escape, typically only very little gas escapes at a relatively low gas escape velocity, while in the remaining second escape phase an extremely large quantity of gas, in particular in the form of a gas particle flow, escapes the degassing opening at a very high flow velocity and high gas pressure. These two gas escape phases can now advantageously be used in order to implement a novel, two-stage gas discharge process that has numerous advantages. The gas escaping in the first escape phase can advantageously be introduced into the degassing channel between the battery unit and the cooling wall due to its small quantity and its low pressure. Although there is typically not a particularly large volume available here, this volume is completely sufficient to accommodate the gas which escapes from a battery cell in the first escape phase. The gas escaping from a cell in this first escape phase is also referred to here as the first part of the gas. This first part of the gas can in turn be used advantageously in order to detect the escape of gas at an extremely early stage, for example by means of a suitable sensor in the degassing channel. In addition, this may be accomplished in a particularly simple manner since the first part of the gas can be distributed in the degassing channel, so that a corresponding sensor can simply be arranged anywhere in the degassing channel. The gas escape can then also be detected by, for example, only one such sensor in the case of multiple cells, independently of which cell the gas escapes from. The provision of the degassing channel, which can thus be used for particularly early detection of a gas escape, may also be provided in an extremely cost-effective manner, since no additional components are required for this purpose. Only the cooling wall can be modified somewhat, for example with regard to its shape, in order to be designed with a groove-shaped depression, for example, to provide the degassing channel. The amount of gas escaping from a battery cell in the second escape phase typically has such a high gas pressure and is so hot that it can automatically cut through the cooling wall opposite to the degassing opening, similarly to a gas burner, and can thus be discharged without an extra opening having a closure having to be provided in the cooling wall for this purpose. The gas escaping in the second escape phase, which is also referred to hereinafter as the second part of the gas, can thus automatically find its way into a significantly larger gas accommodation volume, for example between the cooling wall arrangement and an underride protection of the motor vehicle. No special design of the cooling wall arrangement is required for this purpose either and the costly integration of openings provided with closures can be dispensed with. If, on the other hand, no degassing channel were provided between the battery unit and the cooling wall, the degassing opening of the battery cell would be blocked by the cooling wall arrangement and there would be a risk that the gas produced in the cell in the first escape phase would not be sufficient to make its way through the cooling wall arrangement, which could then result in an overpressure in the cell and an uncontrolled bursting of the cell. This may advantageously be avoided by providing the degassing channel, that is to say a free space which is arranged directly below the degassing opening and is delimited on the underside by the cooling wall with respect to the first direction. The invention thus makes it possible to provide particularly advantageous gas discharge management, which is above all simple and cost-effective to implement.

The cooling wall preferably also represents at the same time a housing wall of a battery housing in which the battery unit is accommodated. The battery arrangement preferably provides a battery, in particular a motor vehicle battery, which is preferably designed as a high-voltage battery. The battery arrangement can therefore function as a traction battery for the motor vehicle, for example. In addition to the cooling wall, the cooling wall arrangement can also have still further elements, in particular further layers, for example a gap pad or a gap filler, i.e., a heat-conducting compound, or in general a thermal interface layer, by which, for example, a good thermal connection of the battery unit to the cooling wall can be provided in that any gaps or air pockets between the battery unit and the cooling wall are closed or avoided by such a layer. Such a thermal interface layer can be interrupted or dispensed with in the area of the degassing channel. Such a thermal interface layer can thus be arranged, for example, only in areas between the battery unit and the cooling base in which the degassing channel is not arranged. Such a thermal interface layer preferably connects the corresponding areas of the battery unit to the cooling wall. The battery unit is therefore connected directly to the cooling wall in some areas via this thermal interface layer. A battery unit can, for example, only comprise the at least one battery cell, that is to say represent the at least one battery cell. However, the battery unit preferably represents a battery module having multiple battery cells, which can also be referred to as a cell module and which can have an additional module housing, for example, in which the battery cells of the battery module are arranged. In this case, the module housing also has an opening in the area of the degassing opening of the at least one battery cell. In the area of the degassing opening, a free area is thus provided between the degassing opening and the cooling wall, which is provided by the degassing channel and in which neither a thermal interface layer nor a part of the module housing is arranged. Furthermore, the battery unit is arranged above the cooling wall arrangement with respect to the first direction. This means that in the present case the terms "above" and "below" and directional specifications derived from them always refer to the first direction. If the first direction is directed, for example, in the direction of a vehicle vertical axis when the battery arrangement is arranged as intended in the motor vehicle, then the battery unit is also actually located above the cooling wall arrangement and if the first direction is oriented, for example, opposite to the motor vehicle vertical axis, then the cooling wall arrangement is actually located above the battery unit. In other words, the cooling wall can represent, for example, a cooling base or else a cooling cover. In principle, the orientation of the battery arrangement in space is irrelevant to its functionality. However, it is particularly advantageous if the cooling wall arrangement is arranged below the battery unit with respect to the intended installation position of the battery arrangement in the motor vehicle and gas discharge can be provided accordingly downwards, for example in the direction of an underride protection. The gas discharge therefore takes place in a direction away from the passenger compartment, which can also increase safety. This can also counteract heating of the passenger cell much more efficiently. The battery cells can be formed, for example, as lithium-ion cells. Furthermore, the battery cell can in principle have any desired geometry and can be designed, for example, as a prismatic cell or round cell or pouch cell. In this context, above all the design of the battery cell as a prismatic cell has proven to be particularly advantageous. The cell poles of such a battery cell are then preferably arranged on a side of the battery cell that differs from the first side. The cell poles, also known as cell terminals, are preferably arranged on two different, opposite sides of the battery cell, which delimit the battery cell perpendicularly to the first direction. For example, the cell poles can be arranged on two opposite sides of the battery cell with respect to one another in relation to a second direction. The second direction is then preferably perpendicular to the first direction. The fact that the cell poles are thus arranged on the sides of the cell housing of the battery cell and not on the top and/or underside of the cell, and in particular not on the first side on which the degassing opening is arranged, also allows significantly simpler decoupling of the HV (high-voltage) path from the outflowing gas to be provided. If the battery unit comprises multiple battery cells in the form of a cell stack, these multiple battery cells are preferably arranged adjacent to one another in a third direction, wherein this third direction is in turn perpendicular to the first and second directions. In this case, the degassing channel also preferably extends in the third direction. This channel can thus advantageously be led along the degassing openings of the respective battery cells of the battery module.

Accordingly, it represents an advantageous embodiment of the invention when the battery unit has multiple battery cells, each of which has a first side having a releasable degassing opening, wherein the degassing channel is led past each of the degassing openings. The gas escaping from a respective cell can thus be introduced into the same degassing channel, in particular again at least a first part of the gas escaping from a relevant cell. Otherwise, the battery cells can be made identical. The examples explained in more detail hereinafter, which refer to the at least one battery cell, therefore apply in the same way to multiple battery cells very similarly. The degassing channel thus represents a cavity that extends beyond the respective degassing openings of multiple battery cells of the battery unit. The degassing channel can even extend beyond the degassing openings of cells various battery units. Accordingly, the battery arrangement can also have multiple battery units, each having multiple battery cells. In principle, the degassing channel can extend straight or also curved. In addition, multiple degassing channels can also be provided, which can be fluidically separated from one another or also fluidically coupled to one another. In the latter case, the degassing channel can thus also be provided as a branched degassing channel system. The examples explained in more detail below with reference to the degassing channel are also to apply analogously to further optional degassing channels.

For example, such a degassing channel may be provided in a simple manner by stamping the degassing channel into a flat cooling plate that provides the cooling wall. As a result, a groove-shaped depression is provided in the cooling wall below the degassing opening of the at least one cell. Accordingly, it thus represents a further very advantageous embodiment of the invention if the cooling wall for providing the degassing channel is formed having a groove-shaped depression with respect to the first direction, wherein the part of the cooling wall having the depression represents a channel wall delimiting the degassing channel. As a result, such a degassing channel can be manufactured very easily and no additional components are required. This channel can therefore simply be stamped into a provided cooling plate. This creates additional space, which is used as the degassing channel in the present case. The depression can extend elongated in a direction perpendicular to the first direction. This has the advantage that the degassing channel can also be led past under further degassing openings of further cells in a simple manner. The degassing channel can thus be used jointly for multiple cells.

In the following, the reference to the gas escaping from the cell or its degassing opening is moreover always to refer to the case of a gas escape from the cell, which is also referred to hereinafter as the degassing case of the cell.

In a further advantageous embodiment of the invention, the cooling wall is designed as a cooling plate through which a coolant can flow. Particularly efficient cooling of the battery unit may be provided by such a cooling plate during normal operation. Cooling channels can therefore extend in the cooling plate, through which the coolant, for example a water-glycol mixture, can be guided. There is preferably no cooling channel in the part of the cooling wall that is located directly below the degassing opening and thus represents part of a channel wall of the degassing channel.

In a further advantageous embodiment of the invention, the cooling wall has an area that provides part of a channel wall of the degassing channel, wherein the battery arrangement has an electrically insulating protective layer that is arranged at least on one area of the cooling wall, which differs in particular from a plastic film. Such a protective layer can advantageously increase the temperature resistance of the area of the cooling wall on which this protective layer is arranged. This has the great advantage that such a protective layer can be used to control when the cooling wall burns through due to the gas flow escaping from the cell, in order in particular to allow the second part of the gas escaping from the cell to be discharged, as has already been described above. It is precisely such a protective layer, for example a coating or a fabric material, on the cooling plate or the cooling wall in general that enables completely novel degassing management. Thus, when the cooling wall burns through due to the gas escaping from the cell can be set and deliberately dimensioned using the material properties of this protective layer and the layer thickness of this protective layer, for example. Such a protective layer is to be understood as a layer that differs from a plastic film. The background to this is that a plastic film is often arranged on cooling plates for electrical insulation in order to ensure reliable electrical isolation from the battery modules or battery cells. Such a plastic film does not noticeably increase the temperature resistance of the cooling wall. An electrically insulating protective layer is therefore to be understood to mean a layer that gives the area on which it is arranged significantly more resistance to the gas flow escaping from the cell than a thin plastic film.

The entire wall of the degassing channel provided by the cooling wall does not necessarily have to be provided with such a protective layer, but this is nevertheless possible. It would also be conceivable to provide such a protective layer only in certain areas, for example in areas of the wall of the degassing channel that are directly opposite to the degassing openings of the cells. This is where the temperature effect due to the gas flow escaping from the cells is greatest. Such a protective layer therefore has the great advantage that the burning through of the cooling wall in the area in which the protective layer is arranged can be delayed. This makes it much easier and more reliable to ensure that a sufficient amount of gas can first get into the degassing channel, for example to be guided to a suitable collection point at which a fire sensor is arranged in order to detect the gas escape early and reliably.

It is furthermore particularly advantageous if the protective layer is formed as a coating of the area or is formed as a fabric layer. In particular, it is particularly advantageous if the protective layer comprises a CDC coating, i.e., a cathodic dip coating as a coating and/or a ceramic layer. A very high temperature resistance of the area on which it is arranged can be achieved in particular by a ceramic layer. However, a CDC coating is also very well suited to being able to deliberately control the burn-through behavior of the area. In addition, this may be achieved much more cost-effectively by a CDC coating than by a ceramic layer. Various fabric layers also come into consideration as a protective layer, in particular made of temperature-resistant fibers such as Kevlar or glass fibers. However, the protective layer is preferably in the form of a coating, since this allows a protective layer to be provided that is significantly thinner and correspondingly requires less installation space.

In a further very advantageous embodiment of the invention, the cooling wall has a failure area which provides part of a channel wall of the degassing channel which is arranged directly below the degassing opening with respect to the first direction and which is formed in such a way that, in case of a gas escape from the degassing opening, in dependence on the escape of a second part of the gas, which is different from the first, in particular in dependence on an application of the second part of the gas to the failure area, it will release an opening penetrating the cooling wall with respect to the first direction by failure. The second part of the gas is therefore a part of the gas escaping from the degassing opening, which escapes from this degassing opening after the first part of the gas. As described at the outset, such a second part of the gas escapes at a significantly higher pressure and also provides a significantly larger volume than the first part of the gas. In this way, in particular with a corresponding design of the failure area, it can fail when this second part of the gas is applied, and in this case automatically releases an opening through which the escaping gas can penetrate the cooling wall and can thus be discharged from the battery housing.

Thus, the cooling wall does not have to be formed having a separately provided opening that is closed with a closure or with a complex valve device designed in a different way. In the failure area, the channel wall can simply be formed having an appropriate material and/or thickness, so that it can be readily cut through by this gas when the second part of the gas is applied. The cooling wall is preferably made of aluminum, in particular as an aluminum sheet, and has a wall thickness of a few millimeters, for example between 1.2 millimeters and 1.5 millimeters. In the area of the cooling channels, the cooling wall can have a thickness of 10 to 15 millimeters, for example. The cooling wall can also have multiple such aluminum sheet metal layers.

The failure area does not necessarily have to fail immediately as soon as the gas escaping from the cell is applied thereto. This can in turn be deliberately controlled by providing the above-described protective layer.

Accordingly, it represents another very advantageous embodiment of the invention when the area in which the protective layer is arranged comprises at least the failure area. In other words, at least the failure area is to be provided with such a protective layer. However, the entire channel wall of the degassing channel provided by the cooling wall can also be provided with such a protective layer. In both cases, the burn-through behavior of the channel wall of the degassing channel, which is provided by the cooling wall, can be deliberately adjusted and dimensioned by the protective layer.

In a further very advantageous embodiment of the invention, the degassing channel is designed in such a way that the first part of the gas can be conducted to a collection area of the degassing channel, on which a fire sensor is arranged, and/or on which a releasable opening for discharging the first part of the gas from the degassing channel is arranged in a part of the cooling wall delimiting the degassing channel, in particular wherein the opening is releasable in dependence on the pressure.

The first part of the gas escaping from the cell may advantageously be detected by a fire sensor. Various physical detection principles can be used for this purpose, for example the detection of temperature, pressure, and/or the gas composition as such. A combination of these is also conceivable. If the first part of the gas escaping from the cell is detected by the fire sensor, for example, upon use in a motor vehicle, a warning message can be output immediately to a driver and/or the battery system can be switched off. This allows corresponding measures to be initiated particularly early. The detection of the escaping gas has the great advantage that, in contrast to the detection of a voltage drop of a battery cell, for example, it clearly indicates an extremely critical state of the cell and also a thermal runaway of the cell. A voltage drop of a cell, on the other hand, can have multiple causes and does not necessarily have to be attributed to a thermal runaway of a cell. The gas can be guided to this collection point automatically, for example, by the degassing channel being designed as closed. The gas is then distributed accordingly in the degassing channel and thus automatically reaches the collection area.

If the internal pressure in the degassing channel thus exceeds a predeterminable limiting value, the releasable opening in the degassing duct can open automatically, as a result of which the gas in the degassing channel can be discharged. The necessary pressure equalization can then be ensured accordingly by the releasable opening in the degassing channel. Such a releasable opening in the degassing channel, which is provided in particular in a part of the cooling wall, can be formed, for example, simply as a bursting membrane or a predetermined breaking point formed in a different way in the cooling wall, or also as a pressure relief valve or the like. It is also sufficient, for example, to provide only one such collection area or only one such releasable opening in the cooling wall. The failure areas described above, on the other hand, can be arranged distributed over the entire degassing channel or can result automatically where a corresponding cell outgasses, since they represent the areas of the cooling wall directly opposite to the degassing openings.

A degassing channel can thus advantageously be integrated into the cooling plate, in particular in a gap between the cooling plate and the battery unit itself, which can be used in particular to record and metrologically detect the first part of the gas escaping from the cell. The degassing channel therefore provides a free space for the outflowing gas under the vent element, i.e., the degassing opening. Depending on the degassing management, the cooling plate area of the degassing channel can be provided with a coating or a fabric material. This can be used to control when the cooling plate is burned through by the gas flow of the cell. This enables, for example, degassing management in which, in the first few milliseconds of outgassing through the coating or the fabric material, the initial amount of gas is conducted via the degassing channel to a collection point, which can then activate a fire sensor there. The remaining gas, which is referred to here as the second part of the gas and which flows out of the cell in the next few seconds, then burns through the cooling plate accordingly, and the gas can fill the space between the cooling plate and, for example, the underride protection located underneath. A particularly large volume is provided in particular in this area between the cooling plate and the underride protection, which can be used to reduce the risk of a gas accumulation, thereby reducing the pressure in the battery system, distributing the gas over a large area under the battery, and lowering the temperature of the gas. This reduces the probability that this gas will be ignited. Ultimately, the gas can be discharged from this volume between the cooling plate or cooling wall and the underride protection at a suitable escape point from the vehicle.

In addition, a motor vehicle having a battery arrangement according to the invention or one of its embodiments should also be regarded as included in the invention.

The motor vehicle according to the invention is preferably embodied as an automobile, in particular as a passenger car or truck, or as a passenger bus or motorcycle.

Furthermore, the invention also relates to a method for discharging a gas escaping from a releasable degassing opening of at least one battery cell of a battery arrangement, wherein the battery arrangement comprises a battery unit which has the at least one battery cell, and wherein the battery unit is arranged on a cooling wall arrangement having a cooling wall and is arranged above the cooling wall arrangement with respect to a first direction, so that a first side of the battery cell, which has the releasable degassing opening, faces toward the cooling wall arrangement. In this case, a first part of the gas escaping laterally first from the degassing opening is introduced into a degassing channel which is arranged below the releasable degassing opening and above the cooling wall with respect to the first direction.

The advantages mentioned for the battery arrangement according to the invention and its embodiments thus apply similarly to the method according to the invention.

The invention also includes refinements of the method according to the invention, which have features as have already been described in conjunction with the refinements of the battery arrangement according to the invention. For this reason, the corresponding refinements of the method according to the invention are not described again here.

The invention also comprises combinations of the features of the described embodiments. The invention also includes implementations that each have a combination of the features of several of the described embodiments, unless the embodiments were described as mutually exclusive.

BRIEF DESCRIPTION OF THE FIGURES

Exemplary embodiments of the invention are described hereinafter. In the figures:

FIG. 2 shows a schematic illustration of the battery arrangement from FIG. 1 during a second phase of the gas escape.

DETAILED DESCRIPTION

Figure 1:
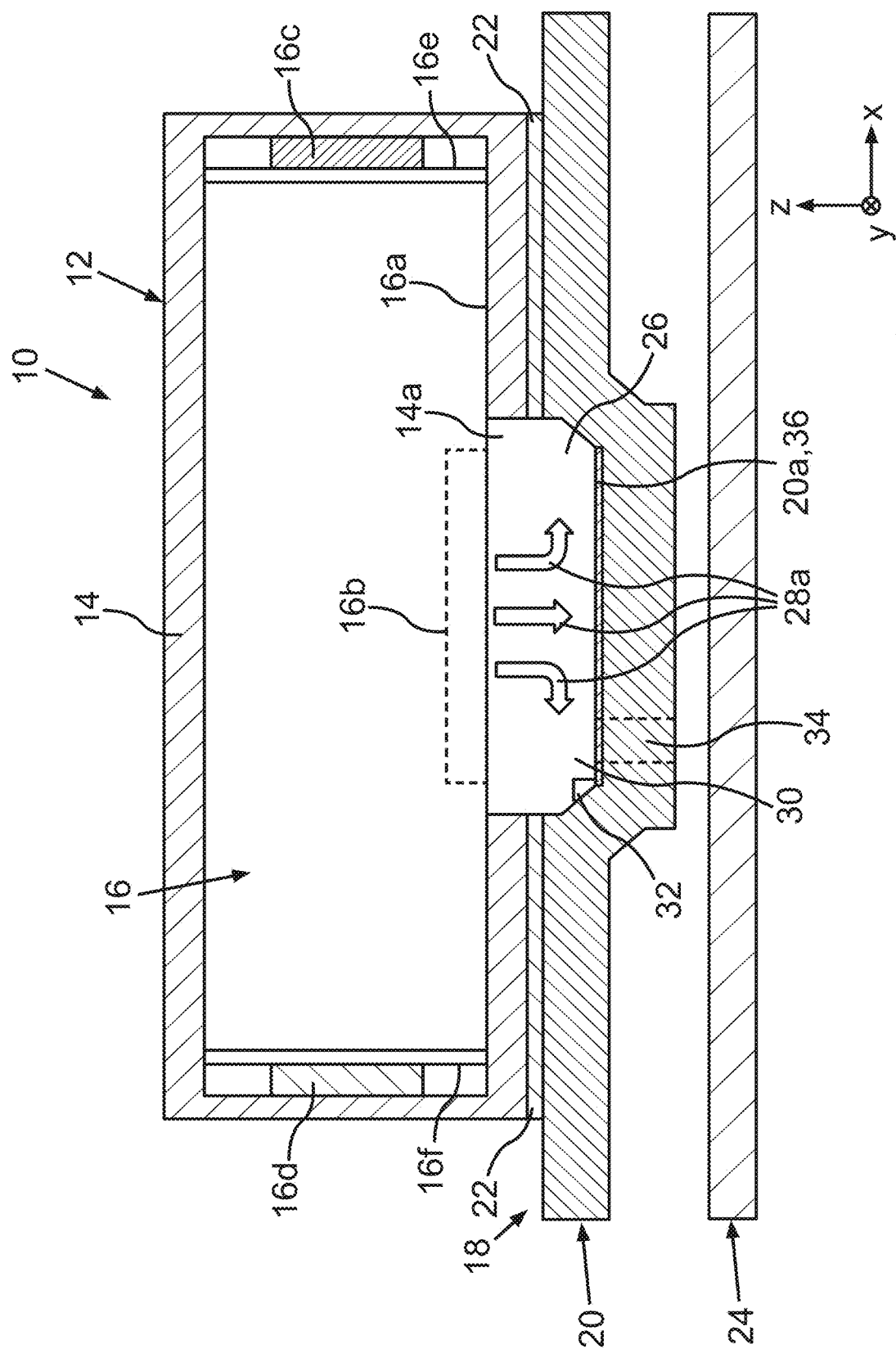
FIG. 1 shows a schematic cross-sectional illustration of a battery arrangement according to one exemplary embodiment of the invention during a first phase of a gas escape from a cell.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by further ones of the already described features of the invention.

In the figures, same reference numerals respectively designate elements that have the same function.

FIG. 1 shows a schematic illustration of a battery arrangement 10 according to one exemplary embodiment of the invention. The battery arrangement 10 has a battery unit in the form of a battery module 12. This battery module 12, also called cell module 12, comprises a module housing 14 in which multiple battery cells 16 are arranged. These battery cells 16 are arranged adjacent to one another with respect to the y direction shown here, so that only one such battery cell 16 can be seen in the cross section. The battery cells 16 are preferably designed as prismatic cells 16 in this example. Such a battery cell 16 comprises a first side 16a, which represents an underside 16a of the cell 16 with respect to the z direction shown. Furthermore, the cell 16 comprises a releasable degassing opening 16b, which is arranged on the underside 16a of the cell 16. The battery arrangement 10 is preferably provided for an arrangement on a motor vehicle, according to which the battery arrangement 10 is arranged having the z direction shown here oriented in the direction of a vehicle vertical axis However, it is also conceivable for the battery arrangement 10 to be arranged in the motor vehicle in such a way that the z direction shown here is oriented counter to a vehicle vertical direction. Furthermore, the cell 16 comprises two cell poles 16c, 16d, which are arranged on opposite sides of the cell 16, in particular on a second side 16e and on a third side 16f of the battery cell 16. As a result, it is advantageously possible to more easily decouple the high-voltage path from the gas escaping from the cell 16 in case of degassing of the cell 16. In addition, in this way the cell 16 or the battery module 12 as a whole can be cooled on both sides, namely from above and also from below, by a corresponding cooling device. In the present example, cooling of the battery module 12 on the underside is provided by a cooling wall arrangement 18 as part of the battery arrangement 10. This cooling wall arrangement 18, more precisely this cooling wall arrangement 18, has in this example a cooling wall 20 which is designed as a cooling plate 20 which can have cooling channels through which a coolant can flow and which are not shown here. This cooling wall 20 can provide a cooling base of a battery housing of the battery arrangement 10, for example. In other words, this cooling wall 20 simultaneously represents an outer wall, in particular a base, of a battery housing in which the battery module 12, preferably multiple such battery modules 12, are accommodated. Alternatively or additionally, this cooling wall 20 can also be arranged above the battery module 12, for example. The battery module 12 is also thermally connected to the cooling wall 20 via a thermal interface layer 22 as part of the cooling wall arrangement 18. This thermal interface layer 22 can be provided, for example, in the form of a gap filler, that is to say a gap-filling material having good thermal conductivity, or in the form of a so-called gap pad. Below this cooling wall 20, in the present case an underride protection 24 is arranged of the motor vehicle in which the battery arrangement 10 is used. In the area of the degassing opening 16b, which is preferably formed as an opening in the cell housing of the cell 16, which is closed using a burst membrane, the module housing 14 also has an opening 14a.

The cooling system 20 is now advantageously designed in such a way that a free space 26 that functions as a degassing channel 26 is provided directly below the degassing opening 16b. This is therefore located between the cooling wall 20 and the battery unit or the battery module 12. This degassing channel 26 can have a width in the x direction which corresponds to the width of the opening 14a in the module housing 12. Correspondingly, this degassing channel 26 is delimited in the z direction by the degassing opening 16b and possibly a part of the first side 16a of the battery cell. The degassing channel 26 is delimited by the cooling wall 20 in the direction counter to the z direction. In the present case, the degassing channel 26 is delimited in and counter to the x direction by the end faces of the module housing 14 delimiting the module housing opening 14a, the thermal interface layer 22, and again parts of the cooling wall 20. Such a degassing channel 26 can be provided in a simple manner, for example, by stamping it into the sheet metal parts of this cooling plate 20 during the production of the cooling plate 20. Incidentally, the cooling plate 20 is preferably manufactured from aluminum. In principle, however, other, preferably metallic materials are also possible. For example, the shape of the degassing channel 26 is stamped into the sheet metal parts of the cooling plate 20 during the manufacturing thereof. This results in a free space 26 for the outflowing gas under the vent element, i.e., the releasable degassing opening 16b of the cell 16.

The outflowing gas is illustrated in the present case in FIG. 1 by the arrows 28a. FIG. 1 shows in particular the battery arrangement 10 during a first escape phase of the gas escape from the cell 16 in case of a thermal event in this cell 16. During this first gas escape phase, typically only a small amount of gas typically having only low gas pressure escapes from the cell 16. This first gas escape phase is generally restricted to the first second of the gas escape and usually only lasts a few milliseconds. This is usually followed by a second gas escape phase, in which an enormous amount of gas escapes from the degassing opening 16b within a very short time under extremely high gas pressure and at a very high temperature, as will be explained in more detail later in conjunction with FIG. 2. The invention now uses this knowledge to provide, so to speak, a two-stage gas discharge management or degassing management. This chronologically first part 28a of the escaping gas can now advantageously be used in order to provide a particularly early detection of this gas escape, for example. This gas 28a escaping in the first escape phase can thus be guided via the degassing channel 26, for example, to a collection area 30 in which, for example, a fire sensor 32 is arranged. Furthermore, in this area 30 or, in principle, at any other point of the degassing channel 26, a releasable opening 34, for example also in the form of a burst element or the like, can be provided, in particular by an area of the cooling wall 20, which simultaneously represents a part of the channel wall of the degassing channel 26. This can be opened passively, for example, when the pressure inside the degassing channel 26 exceeds a specific value, and thus ensure pressure equalization. In the present example, the fire sensor 32, the collection area 30, and this releasable opening 34 are arranged below the degassing opening 16b of the cell 16, although this does not necessarily have to be the case. In principle, these elements can be located at any other point of the degassing channel 26, in particular in relation to the y direction shown here.

Since, as described, the cooling wall 20 is preferably only provided by thin aluminum sheet metal parts, it is advantageous, in order to ensure that this cooling wall 20 in the area of the degassing channel 26 does not burn through downward too early when the gas 28a escapes, if at least one area 20a of the cooling wall 20 has a protective layer 36, which can be formed as a coating or as a layer having a fabric material. This protective layer 36 makes it possible to increase the temperature resistance of the area 20a of the cooling base or the cooling wall 20 and thus control when the cooling plate 20 can burn through. The cooling wall 20 in this area 20a is preferably not burned through until the escaping gas 28a has already been successfully detected by the fire sensor 32. This area 20a comprises at least the area of the cooling wall 20 arranged directly below a respective degassing opening 16b. The gas 28a escaping from the degassing opening 16b is thus applied to this coating or protective layer 36. However, the protective layer 36 can also extend over the entire wall area of the cooling wall 20 delimiting the degassing channel 26. The burn-through behavior can be determined both by the material selection for the protective layer 36 and by its thickness, in particular its thickness in the z direction.

FIG. 2 shows a schematic illustration of the battery arrangement 10 from FIG. 1 during the second gas escape phase. As described, during this second gas escape phase, a significantly larger quantity of gas escapes from the degassing opening 16b at a significantly higher gas pressure. The escaping gas flow 28b, which in the context of the present invention was also referred to as the second part 28b of the gas escaping the cell 16, now burns through the cooling wall 20, in particular in a failure area 38, which is located directly below the degassing opening 16b. This failure area 38 at the same time represents the area in which the protective layer 36 is also arranged, wherein the protective layer 36 can also extend over other areas of the cooling wall 20 as described, which at the same time also provide part of the channel wall of the degassing channel 26. In order to allow this gas flow 28b to burn through the cooling base or the cooling wall 20, this cooling base 20 also does not have to be specially designed. However, the coating 36 of the area 20a of the cooling wall 20 or the provision of the protective layer 36 in this area 20a is advantageous, since this makes it possible to control and determine when such a burn through of the cooling wall 20 and an associated release of an opening 40 in the cooling base or the cooling wall 20 is to take place.

The module housing 14 and the cell housing of the cells 16 are preferably made of aluminum. The protective layer 36 is made of an electrically insulating material. The protective layer 36 is preferably provided by a CDC coating or a ceramic coating.

As a result, the function of the cooling plate 20 may advantageously be expanded by a degassing channel 26. Because multiple functions are integrated in one component, in this case the cooling plate 20, the number of battery components is reduced and the weight of the battery thus decreases. The provision of the coating or the use of a fabric material on the cooling plate 20 enables a novel degassing management. The gas 28a escaping from the cell 16 in the first milliseconds can be introduced into this degassing channel 26 and conducted to a collection area 30 in which a fire sensor 32 can be provided in order to detect the gas escape from the cell 16. A bursting membrane 34 or a pressure relief valve or the like can also be located there in order to provide a pressure equalization option in the event of overpressure in the degassing channel 26. In the second phase of the gas escape, the escaping gas 28b then burns through the cooling base 20 and thus escapes into the intermediate area 42 between the underride protection 24 and the cooling base 20. The gas 28b can be guided out of the vehicle from this area 42, for example after passing through various gas deflection structures. The use of the space 42 between the cooling plate 20 and the underride protection 24 helps prevent a gas accumulation after the outgassing of the cell 16. In the case of large cells 16, this quantity of gas is correspondingly higher and thus the risk of a gas accumulation is higher, which can now be actively counteracted in the present case. Gas accumulation can thus be prevented and the gas can be distributed over a large area under the battery provided by the battery arrangement 10, as a result of which the pressure in the battery system decreases and the temperature of the gas 28b also decreases. This also reduces the probability that this gas 28a will ignite when it escapes from the vehicle.

Overall, the examples show how the invention can provide a degassing channel having a coating that is integrated into the cooling plate to provide a novel degassing management.

The invention claimed is:

1. A battery arrangement for a motor vehicle, comprising:
   a cooling wall arrangement comprising a cooling wall, and
   at least one battery unit which is arranged on the cooling wall arrangement and is arranged above the cooling wall arrangement with respect to a first direction, which battery unit comprises at least one battery cell,
   wherein the at least one battery cell has a first side having a releasable degassing opening, which is releasable for discharging a gas from the at least one battery cell,
   wherein the battery arrangement has a degassing channel into which, in case of a gas escape of a gas from the degassing opening of the at least one battery cell, the escaping gas is at least partially introducible,
   wherein the battery unit is arranged on the cooling wall arrangement in such a way that the first side of the at least one battery cell faces toward the cooling wall arrangement,
   wherein the degassing channel is arranged below the releasable degassing opening and above the cooling wall with respect to the first direction and is designed in such a way that in case of the gas escape of the gas from the degassing opening, a first part of the gas chronologically first escaping from the degassing opening is introducible into the degassing channel,
   wherein the cooling wall has a failure area which provides a part of a channel wall of the degassing channel, which is arranged directly below the degassing opening with respect to the first direction,
   wherein the battery cell of the battery unit is configured to, in case of a gas escape, release gas in two distinct escape phases, the first part releasing gas at a first velocity and a second part, following and differing from the first part, releasing the gas at a second velocity higher than the first velocity,
   wherein the cooling wall is designed in such a way that, in case of a gas escape from the degassing opening, in dependence on the escape of the second part of the gas based on the second part of the gas and not the first part of the gas impinging onto the failure area, the cooling wall releases an opening penetrating the cooling wall with respect to the first direction by failing.

2. The battery arrangement according to claim 1, wherein the cooling wall is designed as a cooling plate through which a coolant can flow.

3. The battery arrangement according to claim 1, wherein the cooling wall has an area which provides part of a channel wall of the degassing channel, wherein the battery arrangement has an electrically insulating protective layer which is arranged at least on one area of the cooling wall, which is different in particular from a plastic film.

4. The battery arrangement according to claim 3, wherein the protective layer is designed as a coating of the area, or is designed as a fabric layer, in particular wherein the protective layer comprises a CDC coating and/or a ceramic layer.

5. The battery arrangement according to claim 1, wherein an area in which a protective layer is arranged comprises at least the failure area.

6. The battery arrangement according to claim 1, wherein the degassing channel is designed in such a way that the first part of the gas can be conducted to a collection area of the degassing channel, on which a fire sensor is arranged; and/or on which a releasable opening for discharging the first part of the gas from the degassing channel is arranged in a part of the cooling wall delimiting the degassing channel, wherein the releasable opening is releasable in dependence on the pressure.

7. The battery arrangement according to claim 1, wherein the battery unit has multiple battery cells, which each have a first side having a releasable degassing opening, wherein the degassing channel is led past each of the degassing openings.

8. The battery arrangement according to claim 1, wherein the cooling wall for providing the degassing channel is formed having a groove-shaped depression in relation to the first direction, wherein the part of the cooling wall having the depression represents a channel wall delimiting the degassing channel.

9. A method for discharging a gas escaping from a releasable degassing opening of at least one battery cell of a battery arrangement, wherein the battery arrangement comprises a battery unit which has the at least one battery cell, wherein the battery unit is arranged on a cooling wall arrangement having a cooling wall and is arranged above the cooling wall arrangement with respect to a first direction, so that a first side of the battery cell, which has the releasable degassing opening, faces toward the cooling wall arrangement, wherein a first part of the gas escaping the degassing opening chronologically first is introduced into a degassing channel which, in relation to the first direction, is arranged below the releasable degassing opening and above the cooling wall, wherein the cooling wall has a failure area which provides a part of a channel wall of the degassing channel, which is arranged directly below the degassing opening with respect to the first direction, wherein the battery cell of the battery unit is configured to, in case of a gas escape, release gas in two distinct escape phases, the first part releasing gas at a first velocity and a second part, following and differing from the first part, releasing the gas at a second velocity higher than the first velocity, wherein the cooling wall is designed in such a way that, in case of a gas escape from the degassing opening, in dependence on the escape of the second part of the gas based on the second part of the gas and not the first part of the gas impinging onto the failure area, the cooling wall releases an opening penetrating the cooling wall with respect to the first direction by failing.

10. The battery arrangement according to claim 2, wherein the cooling wall has an area which provides part of a channel wall of the degassing channel, wherein the battery arrangement has an electrically insulating protective layer which is arranged at least on one area of the cooling wall, which is different in particular from a plastic film.

11. The battery arrangement according to claim 2, wherein the battery unit has multiple battery cells, which each have a first side having a releasable degassing opening, wherein the degassing channel is led past each of the degassing openings.

12. The battery arrangement according to claim 3, wherein the battery unit has multiple battery cells, which each have a first side having a releasable degassing opening, wherein the degassing channel is led past each of the degassing openings.

13. The battery arrangement according to claim 4, wherein the battery unit has multiple battery cells, which each have a first side having a releasable degassing opening, wherein the degassing channel is led past each of the degassing openings.

14. The battery arrangement according to claim 5, wherein the battery unit has multiple battery cells, which each have a first side having a releasable degassing opening, wherein the degassing channel is led past each of the degassing openings.

15. The battery arrangement according to claim 6, wherein the battery unit has multiple battery cells, which each have a first side having a releasable degassing opening, wherein the degassing channel is led past each of the degassing openings.

\* \* \* \* \*